Patented Nov. 4, 1941

2,261,175

UNITED STATES PATENT OFFICE 2,261,175

AZO COMPOUNDS AND MATERIAL COLORED THEREWITH

James G. McNally and Joseph B. Dickey, Rochester, N. Y., assignors to Eastman Kodak Company, Rochester, N. Y., a corporation of New Jersey No Drawing. Application July 1, 1939,
Serial No. 282,526

7 Claims. (Cl. 260—205)

This invention relates to the preparation of a new series of azo dyes. More particularly the invention relates to azo compounds containing at least one sulfonamide group as a substituent on a nitrobenzene nucleus.

We have found that a valuable series of azo dyes suitable for the coloration of organic derivatives of cellulose, particularly cellulose acetate, can be prepared by coupling various aryl coupling components with the diazonium derivatives of the following general type of arylamines:

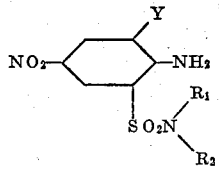

wherein $R_1$ and $R_2$ represent members selected from the group consisting of hydrogen, alkyl groups, alkylene groups, cycloalkyl groups, aryl groups, or heterocyclic groups, and Y represents a member selected from the group consisting of hydrogen, halogen, nitro group, alkyl group, alkoxy group, or the group

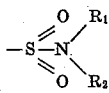

wherein $R_1$ and $R_2$ have the above meanings.

The chemical structure of our azo dyes is represented by the following general formula:

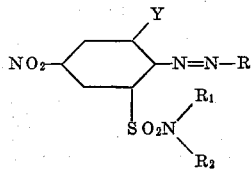

wherein R is an aromatic, hydroaromatic, or heterocyclic nucleus, and $R_1$, $R_2$, and Y have the meanings above defined.

It is an object, therefore, of our invention to prepare the dyes of the class above described and to color cellulose organic derivatives, particularly cellulose acetate in the form of threads, yarns, filaments, and fabric materials therewith.

The amino compounds used in our invention as the diazo components are prepared by halogenating, nitrating, or sulfonating with chlorosulfonic acid the necessary aryl compounds and reacting with ammonia or various amines as desired. For example, the sulfonated nitro anilines of the type:

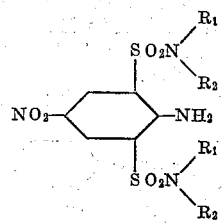

wherein $R_1$ and $R_2$ have the meanings already given, may be prepared by heating p-nitroaniline, p-nitro-o-haloaniline, p-nitro-o-alkylaniline and the like with chlorosulfonic acid and treating with an amine.

The monosulfonamide derivatives such as 5-nitro-2-aminobenzene sulfonamide, 5-nitro-2-aminobenzenesulfonmethyl amide, 5-nitro-2-aminobenzene sulfondimethyl amide, 5-nitro-2-amino-benzenesulfon ethylamide, 3,5-dinitro-2-amino-benzenesulfonmethylamide, and various other similar types of compounds may be prepared by the general method described by P. Fischer, Berichte der deutschen Chemischen Gesellschaft, volume 24, page 3790, (1891).

The following examples illustrate the preparation of the azo compounds of our invention.

*Example 1*

(A) 6.9 grams of sodium nitrite are dissolved at 15° C. in 53 c. c. of sulfuric acid, the mixture warmed at 70° C. and then cooled to 10–15° C.

(B) 21.7 grams of 5-nitro-2-aminobenzene sulfonamide are dissolved in 220 c. c. of hot acetic acid and rapidly cooled to 10–15° C.

The diazotization is carried out by adding solution (B) to solution (A) over a period of 30–45 minutes, meanwhile maintaining a temperature of 10–15° C., and stirring continuously. When the addition is complete, the mixture is further stirred at room temperature for one hour.

The coupling reaction is performed by dissolving 18.1 grams of di-β-hydroxyethylaniline in cold hydrochloric acid, adding ice, and then stirring into this solution the diazo mixture prepared above. After standing for a short time, the mixture is made neutral to Congo indicating paper with sodium acetate, and when coupling is complete, the dye is filtered, washed and dried. Cellulose acetate is colored rubine shades from aqueous dispersions of the dye.

The dye compound has the formula:

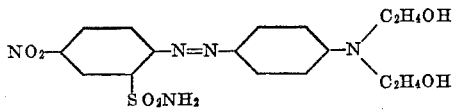

Example 2

23.1 grams of 5-nitro-2-aminobenzene sulfonylmethylamide are diazotized and coupled with 16.5 grams of ethyl-β-hydroxyethylaniline following the procedure described in Example 1. Cellulose acetate is colored rubine shades from aqueous dispersions of the dye.

The dye compound obtained has the formula:

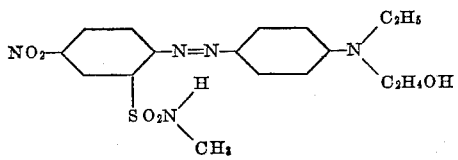

Example 3

29.3 grams of 5-nitro-2-aminobenzene sulfonylanilide are diazotized and coupled with 21.6 grams of di-β-hydroxyethyl-m-chloroaniline following the procedure described in Example 1. The dye colors cellulose acetate red shades from aqueous dispersions of the dye.

The dye compound has the formula:

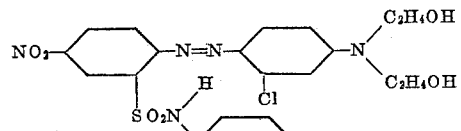

Example 4

(A) 7 grams of sodium nitrite are dissolved in 50 c. c. of sulphuric acid at 10-15° C., the solution heated to 70° C., and then cooled to 10-15° C.

(B) 29.6 grams of 2-amino-3-bromo-5-nitrobenzenesulfonamide are dissolved in 220 c. c. of hot acetic acid and rapidly cooled.

The diazotization is carried out by adding solution (B) to solution (A) over a period of 30-45 minutes, meanwhile maintaining a temperature of 10-15° C., and stirring continuously. When the addition is complete, the mixture is further stirred at room temperature for one hour, and then 1 gram of urea is added.

The coupling reaction is performed by dissolving 18.1 grams of di-β-hydroxyethylaniline in dilute hydrochloric acid, adding ice, and then stirring into this solution, the diazo mixture prepared above. After standing for a short time, the mixture is made neutral to Congo with sodium acetate, and when coupling is complete, the dye is filtered off, washed and dried. Cellulose acetate is colored rubine shades from aqueous dispersions of the dye.

The dye compound has the formula:

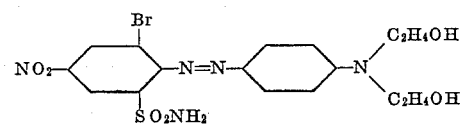

Example 5

35.2 grams of 4-nitro-2,6-di-sulfondimethyl- amide-aminobenzene are diazotized and coupled with 31.1 grams of glycerylcresidine following the procedure described in Example 4. Cellulose acetate is colored violet shades from aqueous dispersions of the dye.

The dye compound has the formula:

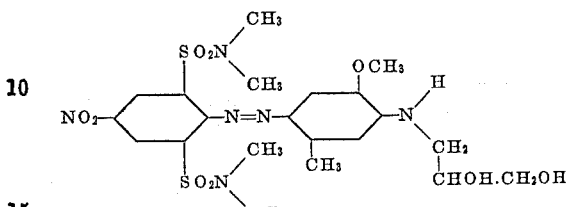

Example 6

24.7 grams of 2-amino-3-methoxy-5-nitrobenzene sulfonamide are diazotized as described in Example 4, and coupled with one equivalent of sodium butyl-sulfate ethyl-m-chloroaniline in water. When the coupling reaction is complete, the dye is salted out, washed and dried. Cellulose acetate is colored rubine shades from aqueous suspensions of the dye.

The azo compound produced has the formula:

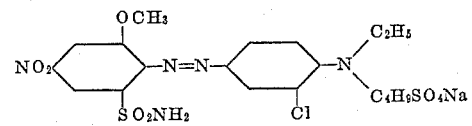

Example 7

One mole of 2-amino-3,5-dinitro-benzene sulfonethylamide is diazotized as described in the previous examples. To this solution there is added with stirring a cold acetic acid solution of an equivalent quantity of glyceryl cresidine. The mineral acid is neutralized at once with sodium acetate and the dye precipitated with water, filtered and dried. The dye thus obtained colors cellulose acetate a purple shade from an aqueous suspension of the dye. It has the structural formula:

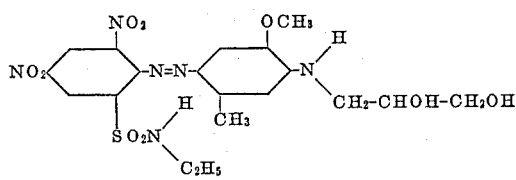

In place of glyceryl cresidine there may be used, 3,6-dimethoxy-glyceryl aniline, ethyl glyceryl aniline, and 3-carbamide-6-methoxy-di-β-hydroxyethylaniline. In each case the dye compound colors cellulose acetate violate shades, except 3-carbamide - 6 - methoxy-di - β - hydroxyethylaniline which colors cellulose acetate a blue shade from an aqueous solution of the dye.

The diazo component may likewise be replaced by other 2-amino-3,5-dinitrobenzene sulfonamide compounds such as 2-amino-3,5-dinitrobenzene sulfonmethylamide, 2-amino-3-5-dinitrobenzene sulfonhydroxyethylamide, 2-amino-3,5-dinitrobenzene sulfondibutylamide, 2-amino-3,5-dinitrobenzene sulfon-β-sodium sulfoethylamide and other similar type of 2-amino-3,5 - dinitrobenzenesulfonomono- and dialkylamides, and coupled with the above mentioned coupling components to yield dye compounds which color cellulose acetate purple and blue shades.

Example 8

One mole of 2-amino-3,5-dinitrobenzene sulfonmethylamide is diazotized and added with stirring to a cold acetic acid solution of one mole of di-β-hydroxyethyl-m-toluidine. After standing for 15-30 minutes, the mineral acid is neutralized and the dye precipitated with water and ice. Cellulose acetate is colored violet shades from an aqueous suspension of the dye.

The azo compound thus obtained has the formula:

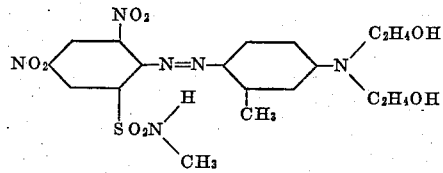

In place of di-β-hydroxyethyl-m-toluidine there may be substituted allyl-m-toluidine, cyclohexyl-m-toluidine, tetrahydrofurfuryl-m-toluidine, di-β-methoxyethyl-m-toluidine, and di-hydroxy-propyl-m-toluidine.

*Example 9*

One mole of 2-amino-3,5-dinitro-sulfonethylamide is diazotized and added to a cold acetic acid solution of one mole of 7-methyl-N-glyceryl tetrahydroquinoline. After standing for 15-30 minutes, the mineral acid is neutralized and the dye precipitated with water and ice. Cellulose acetate is colored blue shades from aqueous suspensions of the dye.

The azo compound obtained has the formula:

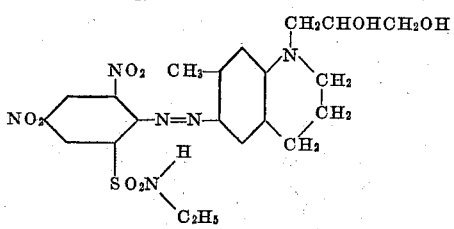

In place of 7-methyl-N-glyceryl tetrahydroquinoline there may be substituted N-glyceryl tetrahydroquinoline which produces violet shades on cellulose acetate from aqueous suspensions of the dye.

*Example 10*

One mole of 2-amino-3,5-dinitro-β-methoxyethylsulfonamide is diazotized and coupled with one mole of 2-ethoxy-5-acetylaminoethyl glyceryl aniline following the procedure described in Example 9. Cellulose acetate is colored blue-green shades from aqueous suspensions of the dye.

The azo compound prepared as above has the formula:

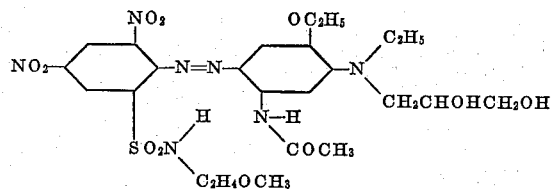

In place of 2-ethoxy-5-acetylamino-ethyl glycerylaniline there may be substituted 3-formylamino-ethyl aniline, 3-lactyl-amino-di-β-hydroxyethyl aniline, 2-ethoxy-5-butyrylamino-ethyl glycerylaniline, 2-chloro-5-benzoylamino-β-hydroxyethylaniline, 2-methyl-5-furoylamino-ethyl glyceryl aniline, 2-ethoxy-5-palmitylamino-ethyl glycerylaniline, 3-carbamino-ethyl glyceryl aniline, 2-ethoxy-5-cyanoacetylamino-ethyl glycerylaniline, 3-methylsulfonamino-β-hydroxyethylaniline, and similar kinds of compounds.

The invention is further illustrated by reference to the following table. The compound listed under the heading "Amine" is diazotized and coupled with an equivalent quantity of the specified compound in the column entitled "Coupling component," the dye resulting therefrom coloring cellulose acetate the shades designated.

*Table*

| Amine | Coupling component | Shade on cellulose acetate |
|---|---|---|
| 2-amino-5 nitrobenzene sulfonamide | (1) Barbituric acid | Green-yellow. |
| | (2) 5,5-dimethyl-cyclohexandione-1,3 | Do. |
| | (3) 1-phenyl-3-methyl-5-pyrazolone | Orange-yellow. |
| | (4) 3-methyl-5-pyrazolone | Do. |
| | (5) Diphenylamine | Violet-red. |
| | (6) Dimethylaniline | Do. |
| | (7) Methyl butyl aniline | Do. |
| | (8) Methyl propyl aniline | Do. |
| | (9) Ethyl-m-toluidine | Do. |
| | (10) β-Hydroxyethyl-aniline | Do. |
| | (11) Di-β-hydroxyethyl-aniline | Do. |
| | (12) β-Hydroxyethyl-m-toluidine | Do. |
| | (13) β-Sodium sulfoethyl propyl-m-toluidine | Purple. |
| | (14) Ethyl glyceryl-m-toluidine | Violet-red. |
| | (15) β-Hydroxyethyl-m-anisidine | Do. |
| | (16) Ethyl glyceryl-m-anisidine | Do. |
| | (17) Cresidine | Do. |
| | (18) Dibutyl cresidine | Do |
| | (19) Ethyl glyceryl cresidine | Rubine. |
| | (20) Glyceryl cresidine | Do. |
| | (21) β-Sodium sulfatoethyl butyl cresidine | Violet-red. |
| | (22) β-Hydroxyethyl glyceryl cresidine | Purple to violet-blue. |
| | (23) β-Hydroxyethyl-m-chloroaniline | Wine. |
| | (24) β-Sodium sulfato-butyl ethyl-m-chloroaniline | Rubine. |
| | (25) 2-methoxy-5-chloro-β-hydroxy-ethylaniline | Do. |
| | (26) 2-methoxy-5-chloro-ethyl-glycerylaniline | Do. |
| | (27) 2-methoxy-5-bromo-ethyl-β-sodium sulfoethylaniline | Violet to purple. |
| | (28) 2,5-dimethoxy-aniline | Violet-red. |
| | (29) 2,5-dimethoxy-β-sodium sulfoethyl butyl aniline | Violet. |
| | (30) 2,5-dimethoxy-β-sodium sulfatoethyl butyl aniline | Purple. |
| | (31) 2,5-dimethyl-ethylaniline | Violet-red. |
| | (32) Glyceryl-α-naphthylamine | Violet. |
| | (33) N-glyceryl-7-methoxy-tetrahydroquinoline | Do. |
| | (34) N-γ-methoxy-β-hydroxypropyl-7-methyl-tetra-hydroquinoline. | Do. |
| 2-amino-5-nitrobenzene sulfonmethylamide | Couplers 1-34 | Same shades. |
| 2-amino-5-nitrobenzene sulfondimethylamide | Couplers 1-34 | Do. |
| 2-amino-5-nitrobenzene sulfondihydroxyethyl-amide | Couplers 1-34 | Do. |

| Amine | Coupling component | Shade on cellulose acetate |
|---|---|---|
| 2-amino-5-nitrobenzene sulfontetrahydrofurfurylamide | Couplers 1-34 | Do. |
| 2-amino-5-nitrobenzene sulfoncetylamide | Couplers 1-34 | Do. |
| 2-amino-3-bromo-5-nitrobenzene sulfonmethylamide | Couplers 1-34 | Do. |
| 2-amino-3-chloro-5-nitrobenzene sulfonmethylamide | Couplers 1-34 | Do. |
| 2-amino-3,5-dinitrobenzene-β-hydroxyethylsulfonamide | (35) di-β-hydroxyethylaniline | Rubine. |
| Do | (36) β-Hydroxyethyl-m-toluidine | Violet. |
| Do | (37) β-Sodium sulfoethyl propyl-m-toluidine | Do. |
| Do | (38) β-Hydroxyethyl-m-anisidine | Do. |
| Do | (39) Ethyl glyceryl cresidine | Red-blue. |
| | (40) Glyceryl cresidine | Purple. |
| | (41) β-Sodium sulfatoethyl butyl cresidine | Red-blue. |
| | (42) β-Hydroxyethyl glyceryl cresidine | Do. |
| | (43) β-Sodium sulfatobutyl ethyl-m-chloroaniline | Rubine. |
| | (44) 2-methoxy-5-chloro-β-hydroxyethylaniline | Violet. |
| | (45) 2,5-dimethoxy-β-sodium sulfoethyl butyl aniline | Do. |
| | (46) 2,5-dimethoxy-β-sodium sulfatoethyl butylaniline | Red-blue. |
| | (47) Glyceryl-α-naphthylamine | Blue. |
| | (48) N-glyceryl-7-methoxy tetrahydroquinoline | Do. |
| | (49) N-γ-methoxy-γ-hydroxypropyl-7-methyl tetra-hydroquinoline. | |
| 2-amino-3,5-dinitrobenzene sulfonallylamide | Couplers 35-49 | Same shades. |
| 2-amino-3,5-dinitrobenzene sulfonethylamide | Couplers 35-49 | Do. |
| 2-amino-3,5-dinitrobenzene-sulfondibutylamide | Couplers 35-49 | Do. |
| 2-amino-3,5-dinitrobenzene-β-sodium sulfoethyl sulfonamide | Couplers 35-49 | Do. |
| 2-amino-3-methyl-5-nitro-benzene sulfonpropylamide | Couplers 35-49 | Do. |

Many of the dyes of our invention being water-soluble, they may be used for the direct coloration of organic derivatives of cellulose, particularly cellulose acetate in the form of threads, yarns, filaments and fabric materials, without the necessity of employing a dispersing or solubilizing agent. The dyeing operation will be conducted in accordance with the usual dyeing practice, salt being added if desired to facilitate exhaustion of the dye bath. For a more detailed description as to how the water-soluble azo dyes of our invention may be employed for the coloration of textile materials, reference may be had to our U. S. Patent No. 2,107,898, issued February 8, 1938.

In the case of the water-insoluble dyes of our invention, they are applied in the form of an aqueous suspension with a suitable dispersing agent such as soap. For example, the dye compound is finely grouped with a dispersing agent such as soap or oleyl glyceryl sulfate and the resulting paste is dispersed in water. The dispersion thus prepared is heated to a temperature approximately 45–55° C. and the cellulose acetate silk in the form of threads or fabric is immersed in the solution, after which the temperature is gradually raised to 80–85° C. and maintained at this point for several hours. Sodium chloride may be added as desired during the dyeing operation to promote exhaustion of the dyebath. Upon completion of the dyeing operation, the cellulose acetate silk is removed, washed with soap, rinsed and dried.

Typical organic derivatives of cellulose include the hydrolyzed as well as the unhydrolyzed cellulose organic acid esters and cellulose mixed organic acid esters such as cellulose acetate, cellulose formate, cellulose propionate, cellulose butyrate, cellulose acetate-propionate, cellulose acetate-butyrate, and cellulose ethers such as methyl cellulose, ethyl cellulose, and benzyl cellulose.

The expression "alkyl" group as used throughout the specification and claims is intended to include the unsubstituted alkyl groups such as methyl, ethyl, propyl, butyl and the like, as well as the substituted alkyl groups such as hydroxyethyl, dihydroxypropyl, methoxethyl, ethoxyethyl, acetoxyethyl, sulfoethyl, and sulfatoethyl groups.

The expression "aryl" group is intended to include the phenyl group, and substituted phenyl groups such as tolyl, xylyl, cresyl, nitrophenyl, chlorophenyl, and sulfophenyl groups.

The expression "cycloalkyl" group includes cyclohexyl and tetra hydronaphthalene groups; and "heterocyclic" group includes tetra hydrofurfuryl, quinoline groups, and the morpholine radical.

The expression "acyl" group is intended to include radicals containing a carbonyl group selected from the aliphatic and aromatic series such as the formyl group, the acetyl group, the propionyl group, the butyryl group, the benzoyl group, a naphthoyl group, the furoyl group, the palmityl group, and other similar type of radicals.

We claim:

1. The azo dye compounds having the general formula:

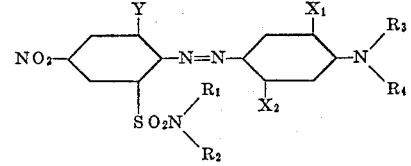

wherein Y represents a member selected from the group consisting of hydrogen, a halogen, an alkyl group, an alkoxy group, a nitro group, and the group

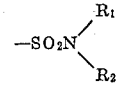

$R_1$, $R_2$, $R_3$ and $R_4$ each represents a member selected from the group consisting of hydrogen, an alkyl group, a cycloalkyl group, an alkylene group, an aryl group of the benzene series, and a furyl group, $X_1$ represents a member selected from the group consisting of hydrogen, a halogen, an alkyl group, an alkoxy group, and $X_2$ represents a member selected from the group consisting of hydrogen, a halogen, an alkyl group, an alkoxy group, and the group —$NHR_5$, wherein $R_5$ represents a member selected from the group consisting of an acyl group, the group —$CONH_2$, the group —$COCH_2CN$, the group —$SO_2CH_3$, and the group —$CO$—$OC_2H_5$.

2. The azo dye compounds having the general formula:

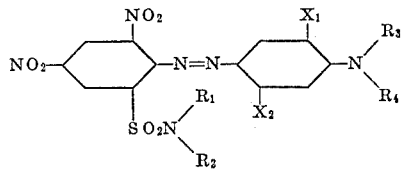

wherein $R_1$, $R_2$, $R_3$ and $R_4$ each represents a member selected from the group consisting of hydrogen, an alkyl group, a cycloalkyl group, an alkylene series, an aryl group of the benzene series, and a furyl group, $X_1$ represents a member selected from the group consisting of hydrogen, a halogen, an alkyl group, and an alkoxy group, and $X_2$ represents a member selected from the group consisting of hydrogen, a halogen, an alkyl group, an alkoxy group, and the group —$NHR_5$, wherein $R_5$ represents a member selected from the group consisting of an acyl group, the group —$CONH_2$, the group —$COCH_2CN$, the group —$SO_2CH_3$, and the group —$CO$—$OC_2H_5$.

3. The azo dye compounds having the general formula:

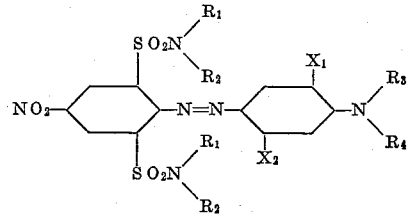

wherein $R_1$, $R_2$, $R_3$ and $R_4$ each represents a member selected from the group consisting of hydrogen, an alkyl group, a cycloalkyl group, an alkylene group, an aryl group of the benzene series and a furyl group, $X_1$ represents a member selected from the group consisting of hydrogen, a halogen, an alkyl group, and an alkoxy group, and $X_2$ represents a member selected from the group consisting of hydrogen, a halogen, an alkyl group, an alkoxy group, and the group —$NHR_5$, wherein $R_5$ represents a member selected from the group consisting of an acyl group, the group —$CONH_2$, the group —$COCH_2CN$, the group —$SO_2CH_3$, and the group —$CO$—$OC_2H_5$.

4. The azo dye compounds having the general formula:

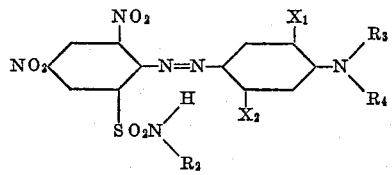

wherein $R_2$, $R_3$, and $R_4$ each represents a member selected from the group consisting of hydrogen, an alkyl group, a cycloalkyl group, an alkylene group, an aryl group of the benzene series, and a furyl group, $X_1$ represents a member selected from the group consisting of hydrogen, a halogen, an alkyl group, and an alkoxy group, and $X_2$ represents a member selected from the group consisting of hydrogen, a halogen, an alkyl group, an alkoxy group, and the group —$NHR_5$, wherein $R_5$ represents a member selected from the group consisting of an acyl group, the group

the group

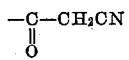

the group

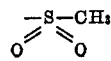

and the group

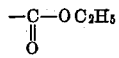

5. The azo dye compounds having the general formula:

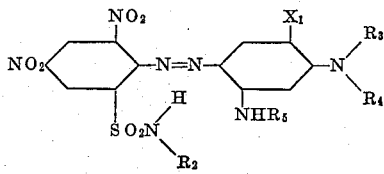

wherein $R_2$, $R_3$, and $R_4$ each represents a member selected from the group consisting of hydrogen, an alkyl group, a cycloalkyl group, an alkylene group, an aryl group of the benzene series, and a furyl group, $X_1$ represents a member selected from the group consisting of hydrogen, a halogen, an alkyl group, and an alkoxy group, and $R_5$ represents a member selected from the group consisting of an acyl group, the group

the group

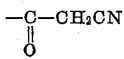

the group

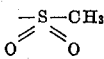

and the group

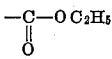

6. The azo dye compounds having the general formula:

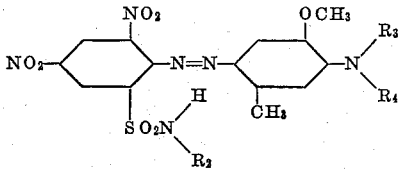

wherein $R_2$, $R_3$, and $R_4$ each represents a member selected from the group consisting of hydrogen, an alkyl group, a cycloalkyl group, an alkylene group, an aryl group of the benzene series, and a furyl group.

7. The azo dye compounds having the general formula:

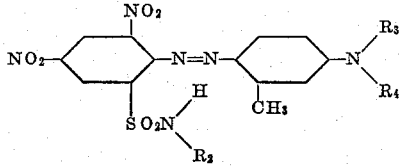

wherein $R_2$, $R_3$, and $R_4$ each represents a member selected from the group consisting of hydrogen, an alkyl group, a cycloalkyl group, an alkylene group, an aryl group of the benzene series, and a furyl group.

JAMES G. McNALLY.
JOSEPH B. DICKEY.